United States Patent
Zurek

(10) Patent No.: US 9,002,868 B2
(45) Date of Patent: Apr. 7, 2015

(54) SYSTEMS AND METHODS FOR SECURE ACCESS OF DATA

(71) Applicant: SAP AG, Walldorf (DE)

(72) Inventor: Thomas Zurek, Walldorf (DE)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 13/765,407

(22) Filed: Feb. 12, 2013

(65) Prior Publication Data

US 2013/0151560 A1 Jun. 13, 2013

Related U.S. Application Data

(63) Continuation of application No. 12/834,750, filed on Jul. 12, 2010, now Pat. No. 8,402,044.

(51) Int. Cl.
*G06F 7/00* (2006.01)
*G06F 17/30* (2006.01)

(52) U.S. Cl.
CPC .... *G06F 17/30545* (2013.01); *G06F 17/30477* (2013.01)

(58) Field of Classification Search
None
See application file for complete search history.

(56) References Cited

U.S. PATENT DOCUMENTS

| | | | |
|---|---|---|---|
| 6,615,203 B1 | 9/2003 | Lin et al. | |
| 6,714,943 B1 * | 3/2004 | Ganesh et al. | 1/1 |
| 6,728,719 B1 * | 4/2004 | Ganesh et al. | 1/1 |
| 7,016,915 B2 | 3/2006 | Shanmugasundaram et al. | |
| 7,197,638 B1 * | 3/2007 | Grawrock et al. | 713/165 |
| 7,315,849 B2 * | 1/2008 | Bakalash et al. | 1/1 |
| 7,552,149 B2 * | 6/2009 | Sinha et al. | 1/1 |
| 2002/0099563 A1 * | 7/2002 | Adendorff et al. | 705/1 |
| 2005/0010565 A1 * | 1/2005 | Cushing et al. | 707/3 |
| 2005/0055385 A1 * | 3/2005 | Sinha et al. | 707/203 |
| 2005/0114505 A1 * | 5/2005 | DeStefano et al. | 709/224 |
| 2005/0114707 A1 * | 5/2005 | DeStefano et al. | 713/201 |
| 2005/0149481 A1 * | 7/2005 | Hesselink et al. | 707/1 |
| 2006/0026154 A1 * | 2/2006 | Altinel et al. | 707/5 |
| 2007/0136323 A1 * | 6/2007 | Zurek et al. | 707/100 |
| 2008/0215556 A1 * | 9/2008 | Surna et al. | 707/4 |
| 2009/0043730 A1 * | 2/2009 | Lavdas et al. | 707/2 |
| 2011/0131199 A1 * | 6/2011 | Simon et al. | 707/714 |
| 2011/0295794 A1 * | 12/2011 | Venkatasubramanian et al. | 707/602 |
| 2012/0011149 A1 | 1/2012 | Zurek | |
| 2014/0283138 A1 * | 9/2014 | Hochberg et al. | 726/30 |

* cited by examiner

*Primary Examiner* — Robert W. Beausoliel
*Assistant Examiner* — Hexing Liu
(74) *Attorney, Agent, or Firm* — Fountainhead Law Group PC

(57) ABSTRACT

In one embodiment the present invention includes a computer-implemented method comprising receiving a first query in a local computer system to access data stored on a remote computer system the local computer system. Data elements of the remote data are associated with data elements of the local data. The query is transformed into multiple queries. A second query is sent to the remote computer system to retrieve remote data. A first data result is received and stored on the local computer system and incorporated into a third query. The third query is executed against the local data and the first data result to produce a result. Sensitive data may be stored locally in a dimension table of a star schema and non-sensitive data may be stored remotely in a fact table and another dimension table of the star schema, for example.

11 Claims, 9 Drawing Sheets

SYSTEMS AND METHODS FOR SECURE ACCESS OF DATA

BACKGROUND

The present invention relates to computing, and in particular, to a systems and methods for secure access of data in a computer system.

Unless otherwise indicated herein, the approaches described in this section are not prior art to the claims in this application and are not admitted to be prior art by inclusion in this section.

In general, the concepts of "virtual" and "cloud computing" includes the utilization of a set of shared remote computing resources (e.g., remote servers) which are typically consolidated in one or more data center locations. For example, cloud computing systems may be implemented as a web service that enables a user to remotely launch and manage computing resources (e.g., virtual server instances) in third party data centers. In a cloud environment, remote computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be a remote internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

One shortcoming of cloud computing, as well as other remote computing techniques, pertains to the security of data on remote computer systems. Sensitive data on remote computer systems may be more vulnerable than data stored locally. For example, if data is stored on local computer systems (e.g., an on-premise installation in an office) a company has complete control over the storage and transmission of data while it is processed by the software. More specifically, data is stored in a local computer system that is owned and protected by the company itself, and data is only transmitted via the company's intranet, which in turn is protected through firewall, anti-virus, anti-spy and other security-related hardware and software.

In the context of cloud computing, data is processed in locations owned by a third party and the data must be transmitted over the Internet. While the data transmitted to remote resources on the cloud is typically secured via encryption and other mechanisms, there is still a loss of control and potential for a security breach.

FIG. 1 illustrates an example of a typical local and remote computer system. A local computer system 101 may be used to access a remote computer system (e.g., a cloud) 102 over a connection 110, such as the Internet. The remote computer system 102 may include computing resources 120A-B (e.g., server computers) for executing software programs. Remote computer system 102 may further store data 121A-B. If a user of local computer system 101 desires to access the remote data 121A-B, a query is executed on the remote computer system 102 against the remote data and the results are sent back local computer system 101, for example.

It is desirable to allow users to maintain more security over data when using remote computer systems, such as a cloud.

SUMMARY

Embodiments of the present invention include systems and methods for secure access of data on a computer system. In one embodiment, the present invention includes a computer-implemented method comprising receiving a first query in a local computer system to access a first plurality of data stored on a remote computer system and a second plurality of data stored on the local computer system, wherein one or more first data elements of the first plurality of data are associated with one or more second data elements of the second plurality of data, transforming the first query to produce a second query and a third query, the second query to apply against the first plurality of data stored on the remote computer system, sending the second query from the local computer system to the remote computer system, wherein a first data result from the first plurality of data is retrieved on the remote computer system in response to the second query, receiving the first data result from the remote computer system in the local computer system, the first data result including the one or more first data elements, storing the first data result on the local computer system, incorporating the one or more first data elements from the first data result into the third query, the third query comprising one or more first query elements of the first query and the one or more first data elements of the first data result, executing the third query on the local computer system against the second plurality of data and the first data result, wherein a second data result is retrieved in response to the third query, and returning the second data result in response to the first query.

In one embodiment, the first plurality of data are stored as tables and the second plurality of data are stored as tables, wherein a first table in the first plurality of data stored on the remote computer system includes a first column, wherein a second table in the second plurality of data stored on the local computer system includes a second column, and wherein the first column is said first data element and the second column is said second data element associated with first data element.

In one embodiment, the first column in the first table and the second column in the second table have surrogate data values, and wherein a third column in the second table has actual data values corresponding to the surrogate data values.

In one embodiment, the first plurality of data and the second plurality of data are configured as a single star schema, the first plurality of data comprising a fact table, and the second plurality of data comprising one or more dimension tables.

In one embodiment, the fact table includes a first column of surrogate values, wherein the first column of the fact table is associated with a first column in a first dimension table, and wherein the first column in the first dimension table includes said surrogate values, the first dimension table comprising a second column comprising actual values corresponding to the surrogate values.

In one embodiment, the first query is a SQL query specifying at least a first column in a first table stored on the remote computer system and at least a second column in a second table stored on the local computer system, and wherein the second query is a SQL query specifying the one or more columns in the first table and one or more third columns in the second table.

In one embodiment, the one or more first data elements incorporated into the third query comprises a first column in a first table in the first data result, and wherein the one or more first query elements comprise a second column in a second table stored on the local computer system.

In one embodiment, the techniques described herein are implemented in an apparatus or process. In one embodiment, the present invention includes a computer readable medium embodying a computer program for performing a method as described herein.

In one embodiment, the present invention includes a computer system comprising one or more local computers. Each local computer may include a processor and a memory. The one or more local computers may be configured to perform a process as described herein. In another embodiment, present invention includes a computer system comprising one or more remote computers, such as a cloud computing system. Each remote computer may include a processor and a memory. The one or more remote computers may be configured to perform a process as described herein.

The following detailed description and accompanying drawings provide a better understanding of the nature and advantages of the present invention.

DETAILED DESCRIPTION

Described herein are techniques for secure access of data on a computer system. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
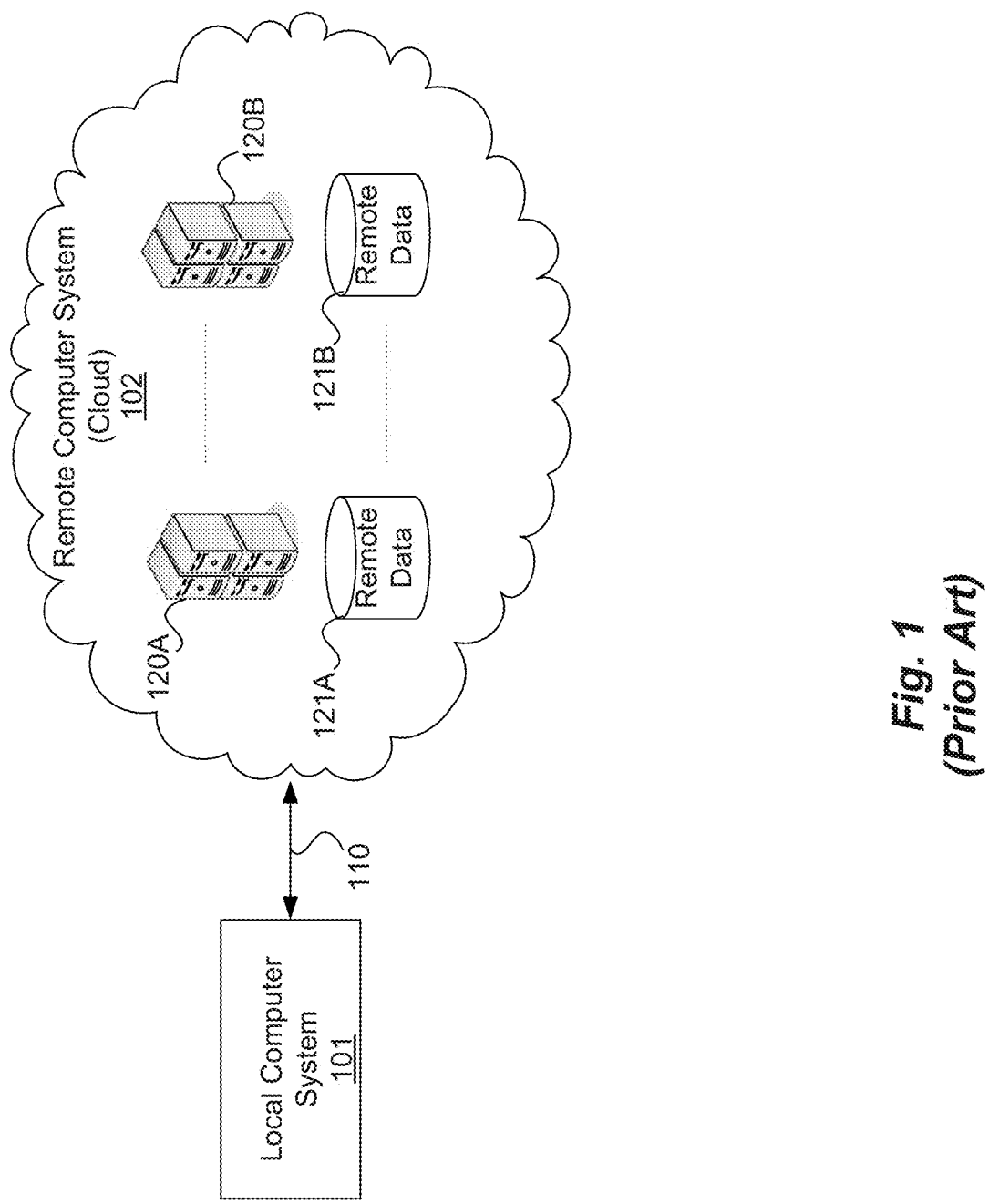
FIG. 1 illustrates an example of a typical local and remote computer system.
Figure 2:
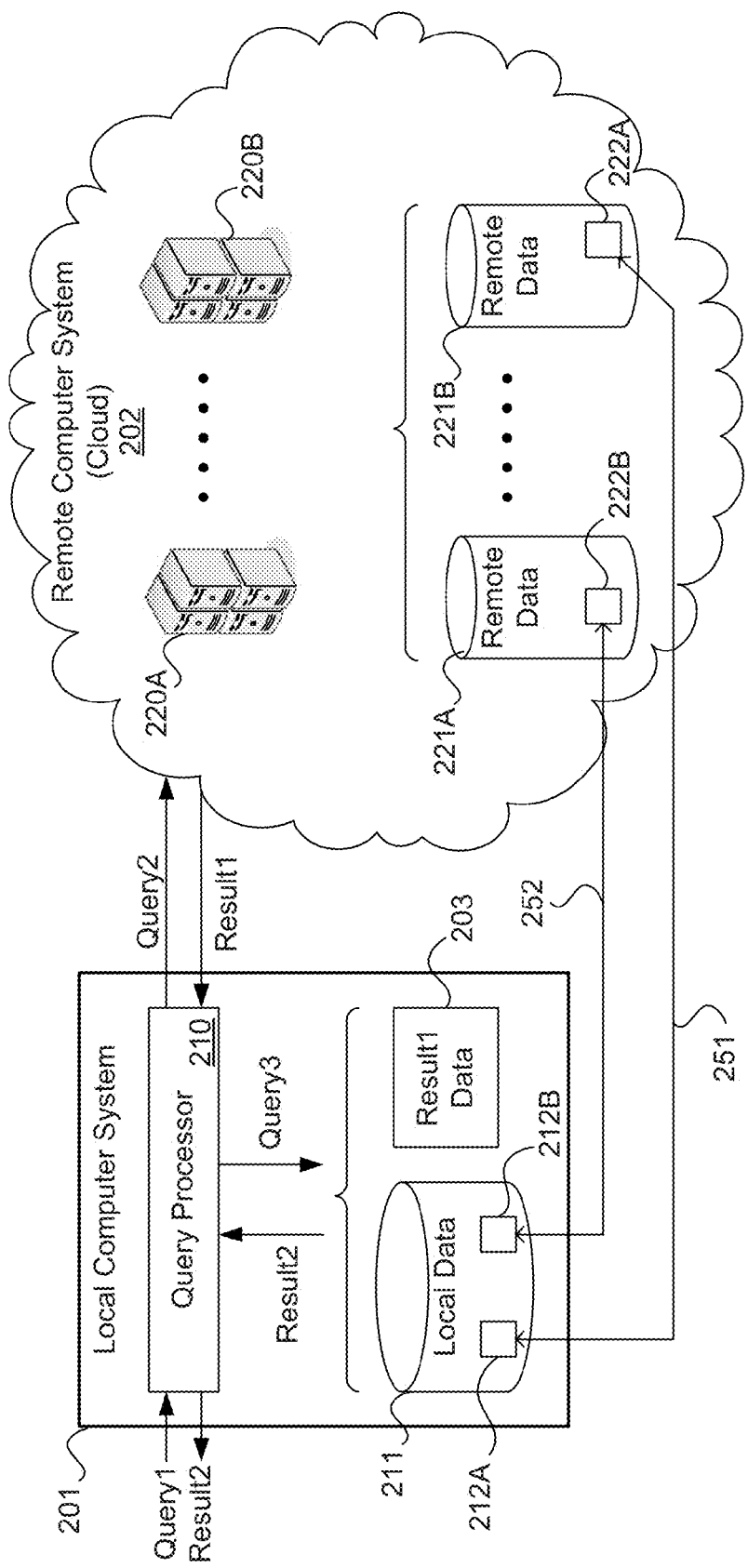
FIG. 2 illustrates a system for accessing data on local and remote computer systems according to one embodiment of the present invention.

FIG. 2 illustrates a system for accessing data on local and remote computer systems according to one embodiment of the present invention. Features and advantages of the present invention include storing sensitive data on a local computer system 201 and storing less sensitive data on a remote computer system 202. Remote computer system 202 may be a cloud computer system, for example. Queries received by local computer system 201 may be transformed to separately query data on remote computer system 202 and on local computer system 201, for example. In one embodiment, a first query ("Query1") is received in local computer system 201. Query1 may be a query to access data 211 stored on local computer system 201 and to access data 221A-B stored on remote computer system 202. Accordingly, Query1 may specify data elements (e.g., columns or attributes) in local data 211 and remote data 221A-B. Query1 may be transformed to produce a second query ("Query2") and a third query ("Query3"). Local computer system 201 may include a query processor software component 210, for example, that receives and transforms Query1. In this example, Query2 is sent from local computer system 201 to remote computer system 202 to apply against data 221A-B stored on the remote computer system 202.

Query2 may be received on one or more physical server computers in remote computer system 202. The physical server computers (not shown) may be running virtual server computers 220A-B, for example. One or more of the virtual server computers 220A-B may receive Query2 and execute the query against remote data 221A or 221B, or both. Remote data 221A-B may be stored in one or more database systems, which may store data on physical memory devices such as a hard disk drive or random access memory ("RAM"), for example. Query2 specifies data elements in data 221A-B from Query1, but may not specify data elements from Query1 that are stored on local computer system 201. In response to Query2, a first data result ("Result1") from data 221A-B is retrieved on remote computer system 202. Result1 is received from remote computer system 202 in local computer system 201. For example, Result1 may be received by query processor 210 and stored on local computer system 201 as illustrated at 203.

Embodiments of the present invention include associating data elements in remote data 221A-B with data elements of local data 211. As illustrated by arrow 251 in FIG. 2, a data element 212A in local data 211 may be associated with a data element 222A in remote data 221B. Similarly, as illustrated by arrow 252, a data element 212B in local data 211 may be associated with a data element 222B in remote data 221A. Examples of data elements that may be associated are attributes of a data object or columns of a table. Result1 includes one or more associated data elements 222A-B. The returned associated data elements are then incorporated into Query3. Accordingly, Query3 includes query elements of Query1 and data elements from Result1. As an example described in more detail below, Query1 may specify a column ("Col1") of a table stored on local computer system 201 and Result1 may include a column ("Col2") from a table in remote data 221A-B. Col2 may be associated with another column ("Col3") of a table stored on local computer system 201, where Col2 and Col3 are associated by using the same column name, for example. Thus, the column name for Col1 and the column name of Col2 may be incorporated into Query3 and applied against local data 211 and Result1 data 203.

Once Result1 is stored and Query3 is created, for example, query processor 210 may execute Query3 on local computer system 201 against local data 211 and Result1 data 203. A second data result ("Result2") is retrieved in response to Query3 and returned to query processor 210, for example. Result2 is returned in response to Query1.

While query processor 210 has been disclosed as performing multiple functions described above, it is to be understood that query processor 210 may represent multiple software components executing on one or more local computers in local computer system 201 for performing the above-described functions. It is also to be understood that Query1 may be generated by a user or a software application, for example. One example implementation of the system in FIG. 2 is a local area network of computers coupled to a cloud computing system over the Internet, for example.

Figure 3:
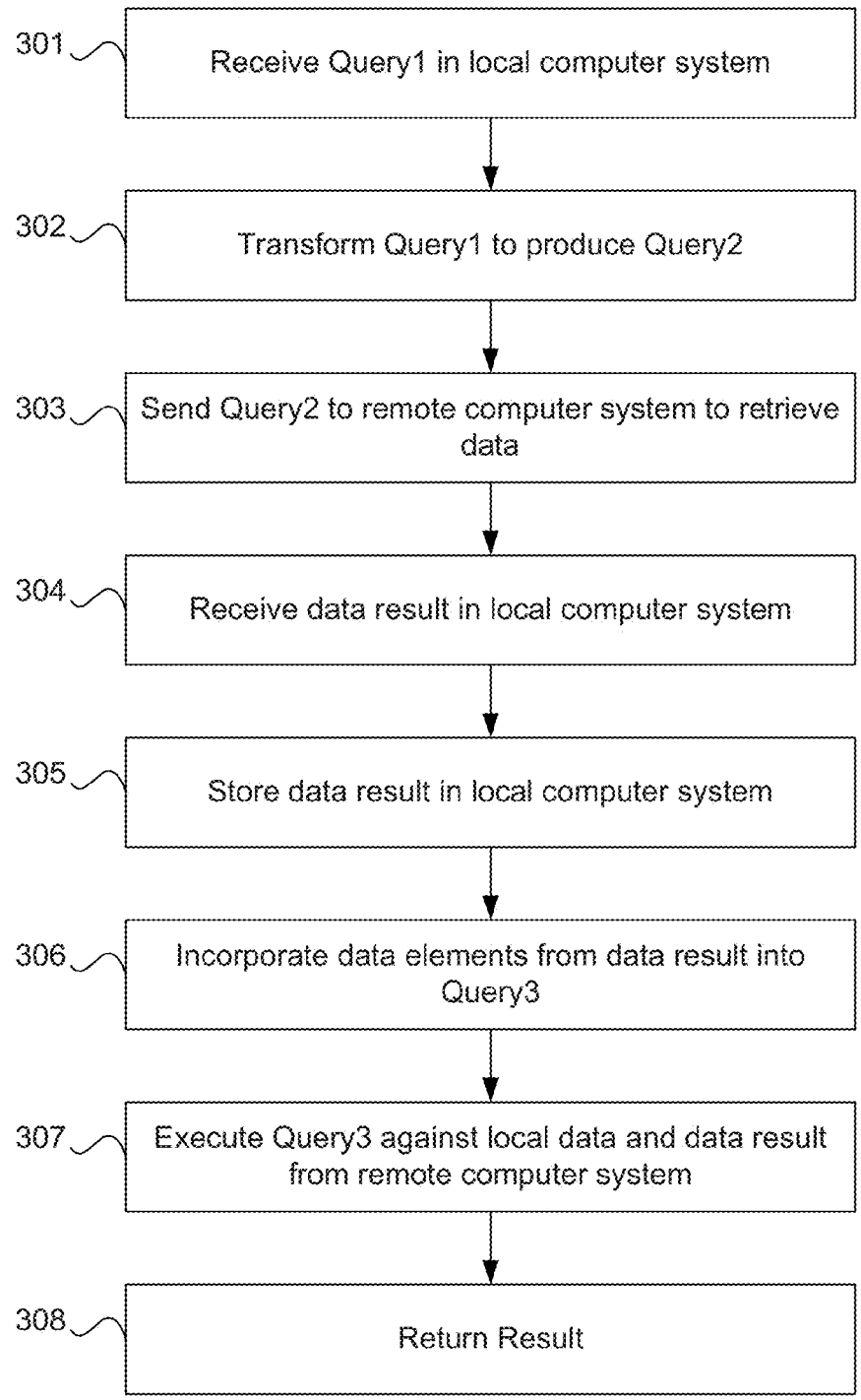
FIG. 3 illustrates a method according to one embodiment of the present invention.

FIG. 3 illustrates a method according to one embodiment of the present invention. At 301, a first query ("Query1") is received in a local computer system. Query1 includes query elements to access data stored on a remote computer system and data stored on a local computer system. Data elements of data on the remote computer system are associated with data elements of data on the local computer system. The associations may support separate queries on the remote and local systems to yield a single result data set, for example. At 302, Query1 is transformed to produce a second query ("Query2"). At 303, Query2 is sent from the local computer system to the remote computer system. Query2 is applied against the data stored on the remote computer system and a first data result ("Result1") from the remote data is retrieved on the remote computer system in response to Query2. At 304, Result1 is received from the remote computer system in the local computer system. Result1 includes data elements associated with data elements on the local computer system data. At 305, Result1 is stored on the local computer system. At 306, data elements from Result1 are incorporated into a third query ("Query3"), which is also derived from Query1. Thus, Query3 includes query elements of Query1 and data elements of Result1. At 307, Query3 is executed on the local computer system against the local data and the data from Result1. A second data result ("Result2") is retrieved in response to Query3. Result2 includes local and remote data and may be the same as if Query1 were executed against both the remote and local data if the remote and local data resided on the same system. At 308, Result2 is returned in response to Query1. It is to be understood that the above method steps may be performed automatically in response to receiving the query without interaction from a user, for example.

Figure 4:
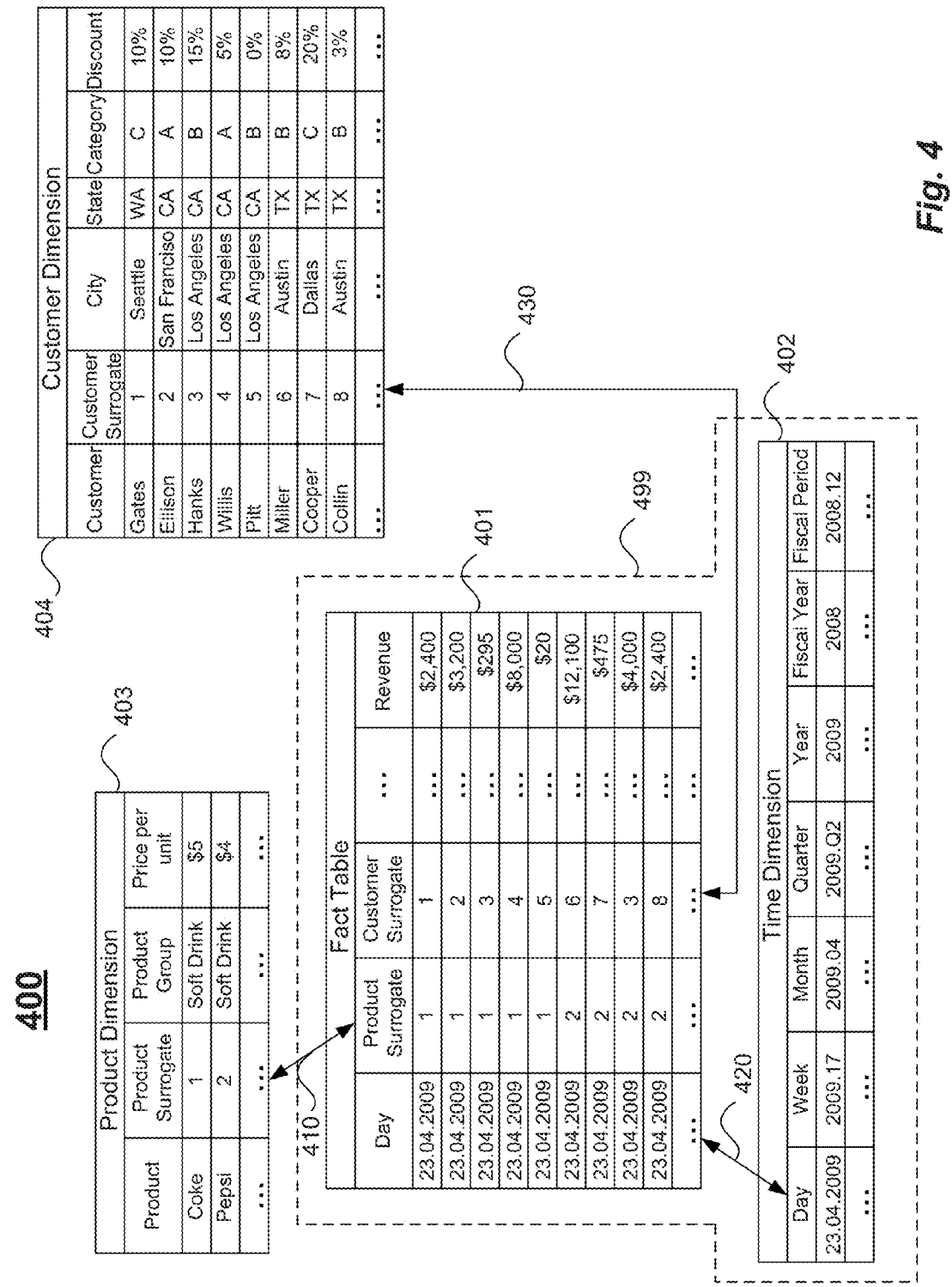
FIG. 4 illustrates an example star schema according to one embodiment of the present invention.

FIG. 4 illustrates an example star schema according to one embodiment of the present invention. In this example, star scheme 400 may be used to store data on a local computer system and a remote computer system. Star scheme 400 includes a fact table 401, time dimension table 402, product dimension table 403, and customer dimension table 404. Embodiments of the present invention include storing one or more dimension tables with sensitive data on a local computer system and storing a fact table and one or more other dimension tables with non-sensitive data on a remote computer system, such as a cloud computer system. In this example, fact table 401 and dimension table 402 are stored on a remote computer system (as illustrated by dashed line 499), and dimension tables 403 and 404 are stored on a local computer system. Data may be retrieved from the star schema by transforming a query into two queries as described above.

In this example, fact table 401 includes a primary key, which is a set of columns that hold the foreign keys to the dimension tables. The primary key columns in fact table 401 are Day, Product, and Customer, where the data in the fact table 401 and the data in the time dimension table 402 are designated as non-sensitive, and therefore, stored on a remote computer system. Columns of fact table 401 are associated with columns in dimension table 402 on the same computer system and with columns in dimension tables 403-404, on a different computer system. Specifically, the "Day" column in fact table 401 is associated (double arrow 420) with the "Day" column in dimension table 402 stored with the fact table 401 on a remote computer system. The "Product Surrogate" column in fact table 401 is associated (double arrow 410) with the "Product Surrogate" column in dimension table 403 stored on a local computer system, and the "Customer Surrogate" column in fact table 401 is associated (double arrow 430) with the "Customer Surrogate" column in dimension table 404, which is also stored on a local computer system. Other columns in fact table 401 may be measures (e.g. columns with values that can be aggregated using some appropriate aggregation function). In the example fact table 401, Revenue is a measure.

Each dimension table has primary key columns In this example, time dimension table 402 has a primary key "Day", product dimension table 403 has a primary key "Product Surrogate", and customer dimension table 404 has a primary key "Customer Surrogate". Dimension tables may have additional columns containing attributes and hierarchy levels, for example. In this example, product dimension table 402 includes a Price per unit attribute. Additionally, in this example, Product Group is a hierarchy level (e.g., pertaining to a variety of hierarchies).

Embodiments of the present invention may include using surrogate columns to query data stored on different computer systems, as mentioned in the example above. For example, one table on a remote computer system may include a surrogate column that is associated with a column of a table on a local computer system. In the example of FIG. 4, fact table 401 includes surrogate columns "Product Surrogate" and "Customer Surrogate" filled with surrogate data values. In a typical star schema, a "Products" column may be included in the fact table with actual product data values. However, because the "Product" column is designated to be sensitive, it is moved from the fact table, which is stored remotely, to the dimension table, which is stored locally. In this case, fact table 401 includes a "Product Surrogate" column populated with surrogate values (e.g., unique values, in this case integers) corresponding to the actual values in the dimension table. Specifically, a surrogate data value of '1' represents "Coke" and a surrogate data value of '2' represents "Pepsi". In this example, product dimension table 403 includes a surrogate column "Product Surrogate" that is associated with the "Product Surrogate" column in fact table 401. The "Product Surrogate" column in product dimension table 403 is filled with the same surrogate values as the "Product Surrogate" column from fact table 401. Additionally, actual data values corresponding to the surrogate data values are stored in a "Products" column of the product dimension table 403. In this case, surrogate data values from fact table 401 may be used to determine corresponding products from the association between columns Data stored locally and remotely in star schema 400 may be accessed using a single query. The query is transformed into a query for accessing the fact table 401 and dimension table 402 on a remote computer system and another query for accessing dimension tables 403 and 404 on a local computer system. The following is an example of an initial SQL query:

SELECT D1.A, D2.B, D3.C, . . . , sum(F.X), avg(F.Y)
FROM F, D1, D2, D3, . . .
WHERE <Equi-Join Conditions>
AND <Filter Conditions on Columns of F, D1, D2, D3, . . . >
GROUP BY D1.A, D2.B, D3.C, . . .
HAVING <Having Conditions on Aggregated Values>

The above SQL query includes query elements specifying columns in dimension tables D1, D2, and D3, and fact table F. For this example, D1 may refer to dimension table 402, D2 may refer to dimension table 403, D3 may refer to dimension table 404, and F may refer to fact table 401. The above query specifies column D1.A of a dimension table D1 stored on a remote computer system and table F of a fact table stored on the remote computer system. Additionally, the query includes columns D2.B and D3.C of dimension tables D2 and D3 stored on a local computer system. The query may be issued by an application or other software program on a local computer system, for example. The query may be transformed into a new query to access data on a remote computer system as follows:

SELECT D1.A, F.D2_SURROGATE, F.D3_SURROGATE, . . . , F.X, F.Y
FROM F, D1
WHERE <Equi-Join Condition for Join between F and D1>
AND <Filter Conditions on Columns of F, D1>

The second query is a SQL query specifying the F.D2_SURROGATE and F.D3_SURROGATE columns in a remotely stored fact table and D1.A column in a remotely stored dimension table D1. The second query above substitutes columns in dimension tables that are stored locally with surrogate columns in a fact table stored remotely. Additionally, dimension tables stored locally are eliminated from the query. The aggregations functions such as SUM and AVE may be removed from the second query along with the associated GROUPBY and HAVING clauses and perform the aggregation functions locally. Some aggregations functions may be performed partially remotely (e.g., SUM, MIN, MAX, COUNT) and other aggregation functions are performed entirely locally (e.g., AVE). An example method of transforming the first query into the second query is provided below and illustrated in FIG. 5. The second query returns a result, R. The following third query is created and may be performed locally and incorporates columns that have been removed from the first query:

SELECT R.A, D2.B, D3.C, . . . , sum(F.X), avg(F.Y)
FROM R, D2, D3, . . .
WHERE <Equi-Join Conditions R.D2_SURROGATE=D2.D2_SURROGATE . . . >
AND <Original Filter Conditions from first query on Columns of D2, D3, . . . >
GROUP BY R.A, D2.B, D3.C, . . .
HAVING <Having Conditions on Aggregated Values>

The third query incorporates data elements from the result, R. For example, column R.A is included in the SELECT clause and table R is included in the FROM clause. Additionally, query elements from the first query are included in the third query. For example, columns D2.B and D3.C from dimension table D2 and D3, which are stored on the local computer system, are included in the third query.

Figure 5:
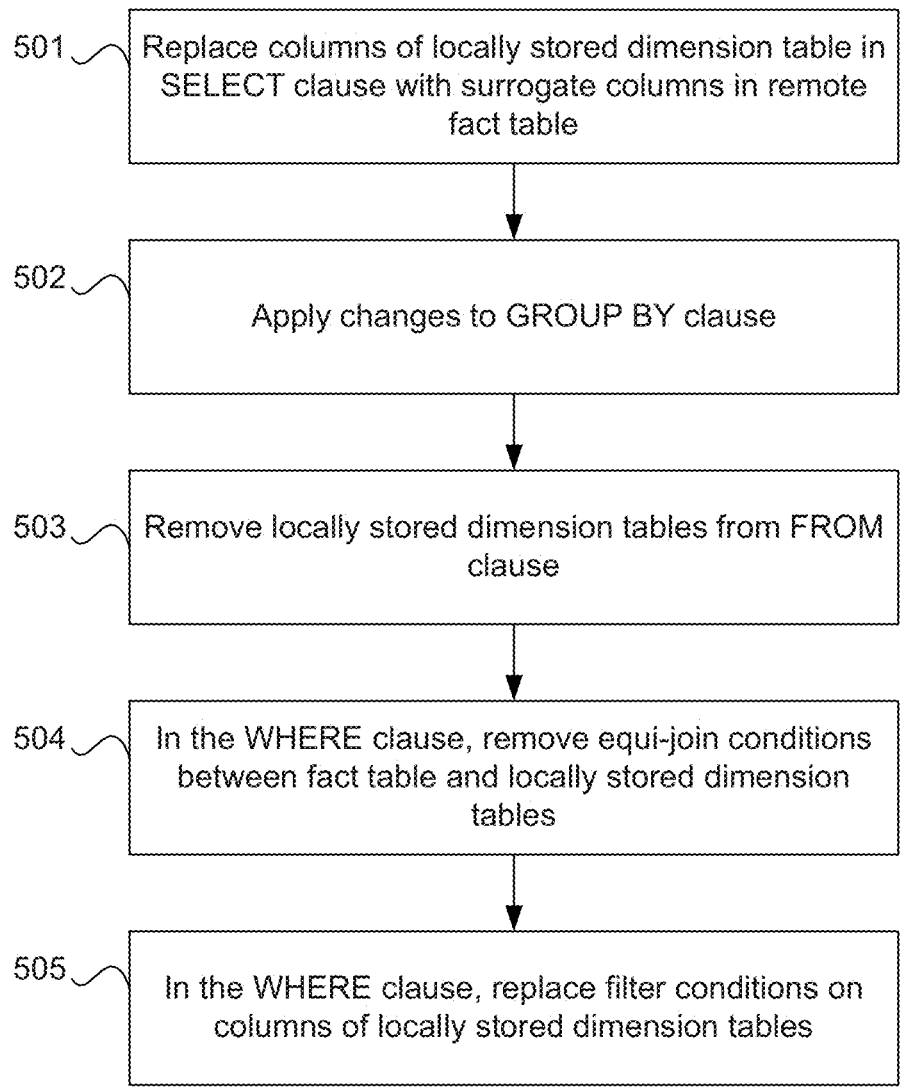
FIG. 5 illustrates an example method of transforming an input query into a second query according to one embodiment of the present invention.

FIG. 5 illustrates an example method of transforming a first query into second query according to one embodiment of the present invention. At 501, columns of locally stored dimension tables in a SELECT clause of the first query are replaced with surrogate columns of a remotely stored fact table. At 502, the changes in the SELECT clause are applied to the GROUP BY clause. At 503, locally stored dimension tables are removed from the FROM clause so that the second query includes only remotely stored tables in the FROM clause. At 504, equi-join conditions between the remotely stored fact table and locally stored dimension tables are removed from the WHERE clause. At 505, filter conditions on columns of locally stored dimension tables are replaced in the WHERE clause. For example, a condition D.A <comparison-operator> <values> may be translated into F.D_SURROGATE IN (<surrogate values>). In this example, the list <surrogate values> can be computed by the simple SQL query as follows:

SELECT D.D_SURROGATE
FROM D
WHERE D.A <comparison-operator> <values>

In the example first SQL query above, the HAVING clause is left unchanged.

Figure 6A:
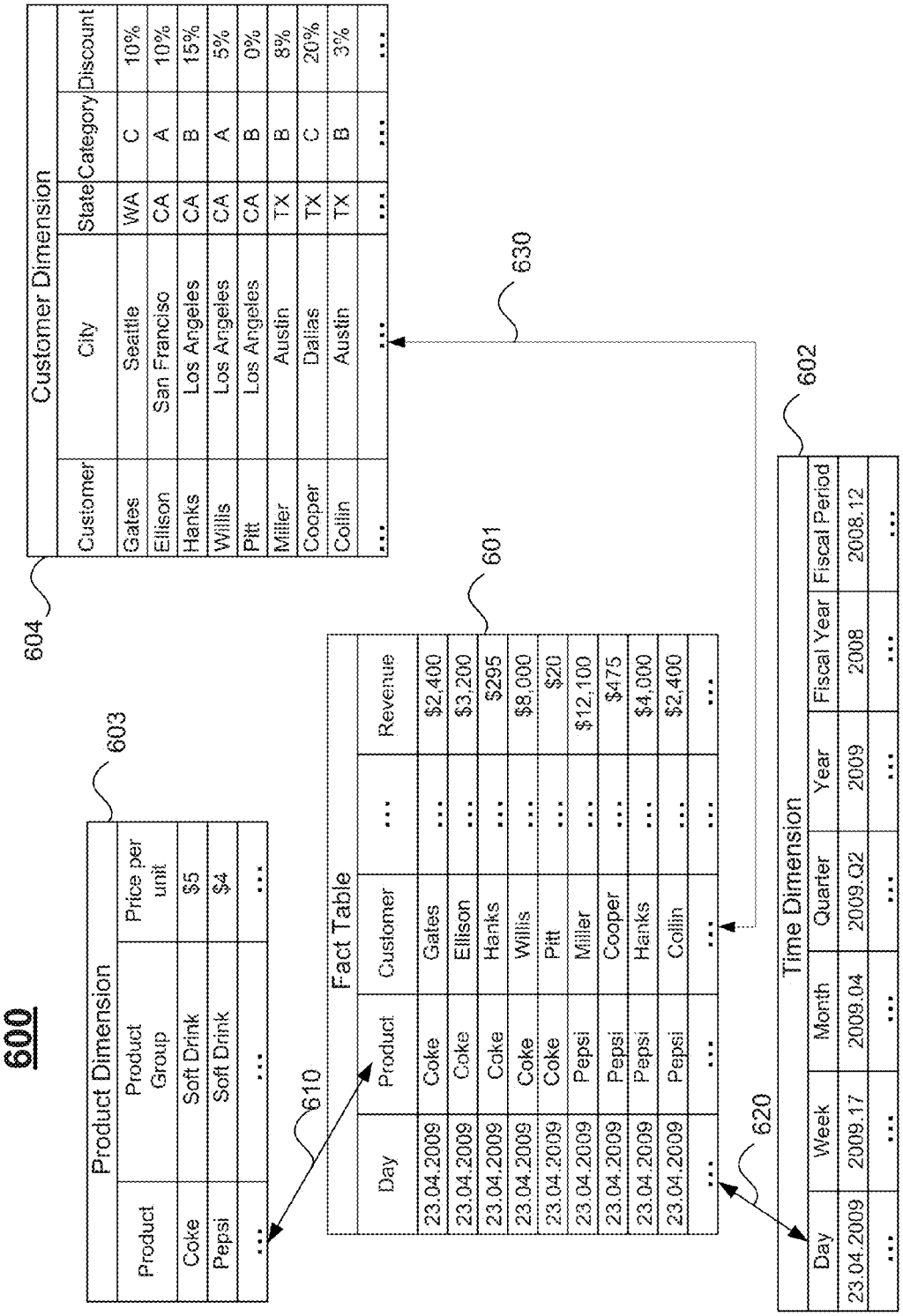
FIG. 6A is an example of an unmodified star schema.
Figure 6B:
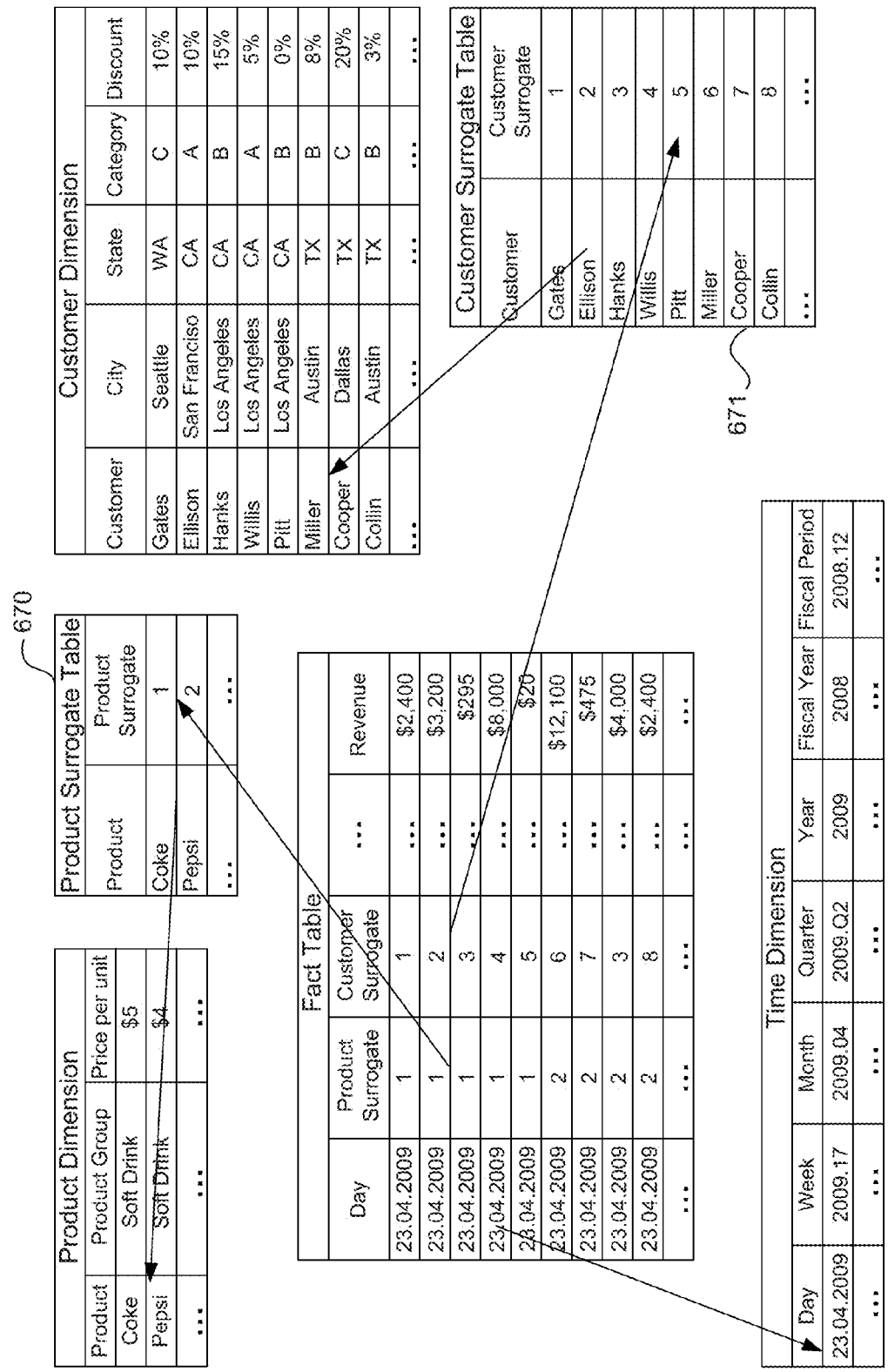
FIG. 6B is another example star schema according to one embodiment of the present invention.
Figure 7:
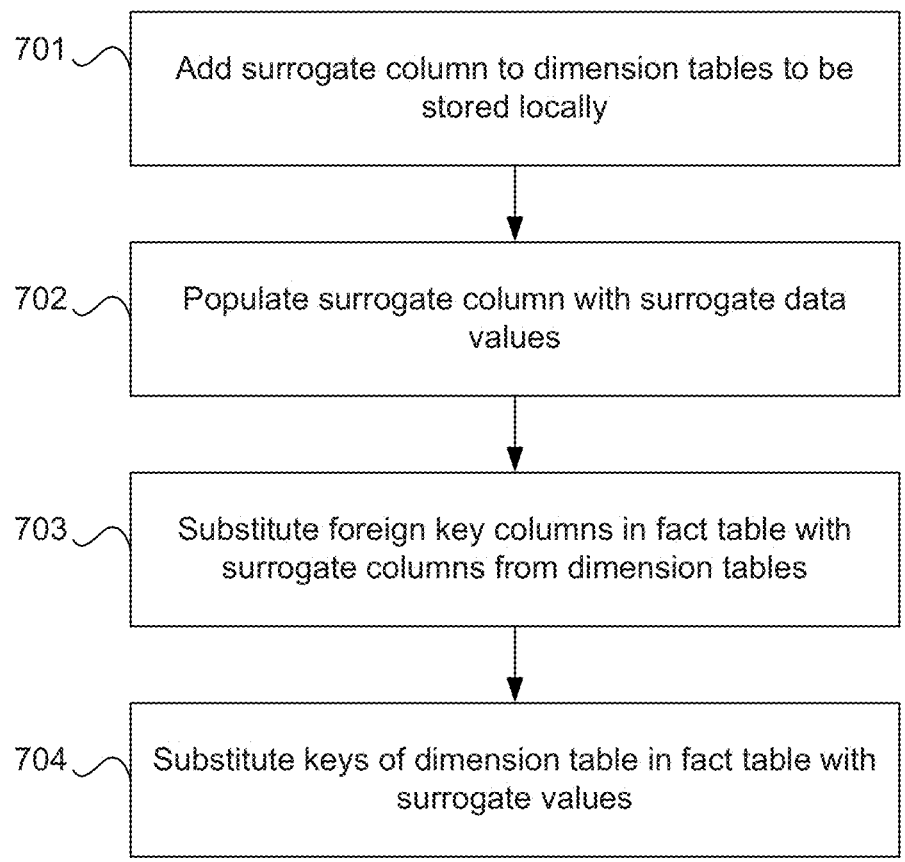
FIG. 7 illustrates a method of modifying a star schema according to one embodiment of the present invention.

FIGS. 6-7 illustrate an example method of transforming a star schema according to one embodiment of the present invention. In one embodiment, a star schema 600 in FIG. 6A may be modified to partition data between a local computer system and a remote computer system, where sensitive data is stored locally and data that is not designated as sensitive is stored remotely. The result may be the star schema 400 in FIG. 4. One example method of modifying star schema 600 into star schema 400 is set forth in FIG. 7. Star schema 600 includes a fact table 601, time dimension table 602, product dimension table 603 and a customer dimension table 604. A "Day" column in fact table 601 is associated at 620 with a "Day" column in dimension table 602, a "Product" column in fact table 601 is associated at 610 with a "Product" column in dimension table 603, and a "Customer" column in fact table 601 is associated at 630 with a "Customer" column in dimension table 603. Referring to FIG. 7, star schema 600 may be modified to store sensitive data locally and data designated as non-sensitive remotely. At 701, a surrogate column is added to each dimension table to be stored locally (e.g., dimension tables that store sensitive data). At 702, the surrogate column is populated with surrogate data values. In one embodiment, surrogate data values are unique values corresponding to the actual data values (actual primary key values). In star schema 400, the surrogate data values are unique integers that are used to represent "Products" (e.g., "Coke"=1, "Pepsi"=2) and "Customers" ("Gates"=1, "Ellision"=2, "Hanks"=3, etc. . . . ). It is to be understood that other surrogate data values could be used, such as letters or characters, or combinations thereof, for example. At 703, foreign key columns in the fact table are substituted with the surrogate columns from each dimension table. For example, in star schema 400, the columns "Product Surrogate" and "Customer Surrogate" are substituted for "Product" and "Customer" columns in fact table 601. At 704, keys of the dimension table in the fact table (e.g., Product and Customer values in fact table 601) are substituted with the surrogate data values from the surrogate columns of the dimension tables. For example, the surrogate data values are inserted into the "Product Surrogate" and "Customer Surrogate" columns in fact table 401. The result is that star schema 600 is transformed into star schema 400. FIG. 6B illustrates an alternative implementation using separate tables to associated surrogate data values with actual data values in the dimension tables. In FIG. 6B separate tables 670 and 671 are used to relate surrogate data values with actual data values. In FIG. 4, table 670 is merged into table 403 and table 671 is merged into table 404.

Figure 8:
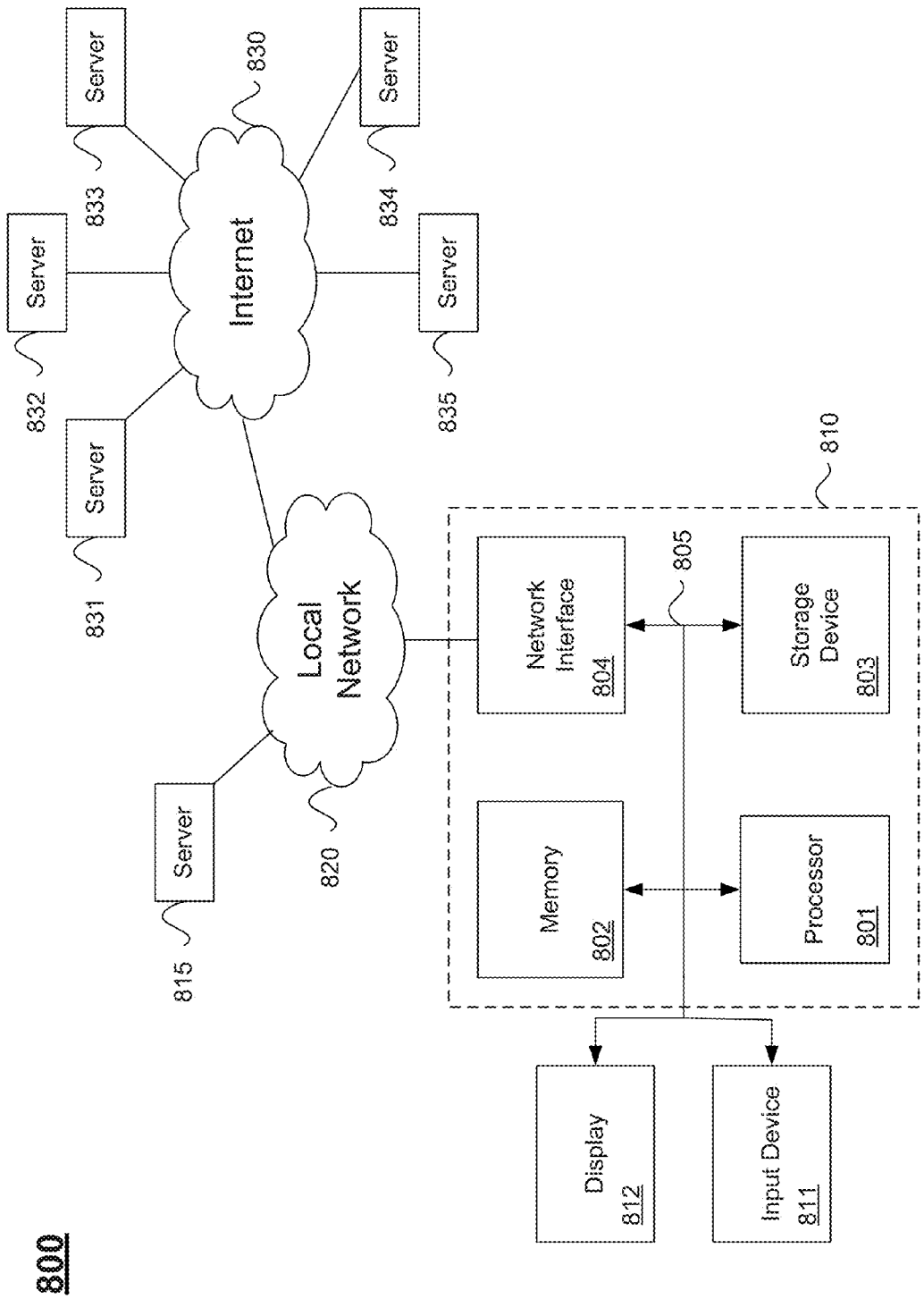
FIG. 8 illustrates hardware of a special purpose computing machine configured with a dynamic provisioning process according to one embodiment of the present invention.

FIG. 8 illustrates hardware of a special purpose computing machine configured with a secure data process according to one embodiment of the present invention. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a query at a first computer system;
using a portion of the received query to access non-sensitive data stored at a second computer system, remotely separated from the first computer system, which relates to a response to the received query;
generating the response to the received query using the non-sensitive data accessed from the second computer system and using another portion of the received query to access sensitive data that is stored locally at the first computer system; and
sending the response as a reply to the received query,
wherein data stored in the first computer system and data stored in the second computer system collectively define a star schema, wherein one or more dimension tables of the star schema comprise data stored in the first computer system and a fact table of the star schema comprise data stored in the second computer system; and
wherein the fact table includes a first column of surrogate values, wherein the first column of the fact table is associated with a first column in a first dimension table, wherein the first column in the first dimension table includes said surrogate values, the first dimension table comprising a second column comprising actual values corresponding to the surrogate values;
wherein the received query is an SQL query specifying at least a first column in a first table stored in the first computer system and at least a second column in a second table stored on the second computer system, wherein accessing the non-sensitive data includes generating a derived SQL query specifying the one or more columns in the second table and one or more third columns in the first table.

2. The method of claim 1 wherein accessing the non-sensitive data includes generating a first derived query from the received query and executing the first derived query against database tables stored at the second computer system.

3. The method of claim 2 wherein generating the response further includes generating a second derived query from the received query and executing the second derived query against at least some of the non-sensitive data accessed from the second computer system and the sensitive data that is stored locally at the first computer system.

4. The method of claim 1 wherein the sensitive data is only stored locally at the first computer system.

5. A non-transitory computer readable storage medium having stored thereon a computer executable program, which, when executed by a processor at a first computer system, causes the processor to perform a method comprising:
receiving a query at the first computer system;
using a portion of the received query to access non-sensitive data stored at a second computer system, remotely separated from the first computer system, which relates to a response to the received query;
generating the response to the received query using the non-sensitive data accessed from the second computer system and using another portion of the received query to access sensitive data that is stored locally at the first computer system; and
sending the response as a reply to the received query,
wherein data stored in the first computer system and data stored in the second computer system collectively define a star schema, wherein one or more dimension tables of the star schema comprise data stored in the first computer system and a fact table of the star schema comprise data stored in the second computer system, and wherein the fact table includes a first column of surrogate values, wherein the first column of the fact table is associated with a first column in a first dimension table,
wherein the first column in the first dimension table includes said surrogate values, the first dimension table comprising a second column comprising actual values corresponding to the surrogate values;
wherein the received query is an SQL query specifying at least a first column in a first table stored in the first computer system and at least a second column in a second table stored on the second computer system, wherein accessing the non-sensitive data includes generating a derived SQL query specifying the one or more columns in the second table and one or more third columns in the first table.

6. The non-transitory computer readable storage medium of claim 5 wherein accessing the non-sensitive data includes generating a first derived query from the received query and executing the first derived query against database tables stored at the second computer system.

7. The non-transitory computer readable storage medium of claim 6 wherein generating the response further includes generating a second derived query from the received query and executing the second derived query against at least some of the non-sensitive data accessed from the second computer system and the sensitive data that is stored locally at the first computer system.

8. The non-transitory computer readable storage medium of claim 5 wherein the sensitive data is only stored locally at the first computer system.

9. A computer system comprising:
one or more local computers, each local computer including a processor and a memory, the one or more local computers configured to:
receive a query at the first computer system;
use a portion of the received query to access non-sensitive data stored at a second computer system, remotely separated from the first computer system, which relates to a response to the received query;
generate the response to the received query using the non-sensitive data accessed from the second computer system and using another portion of the received query to access sensitive data that is stored locally at the first computer system; and
send the response as a reply to the received query,
wherein data stored in the first computer system and data stored in the second computer system collectively define a star schema, wherein one or more dimension tables of the star schema comprise data stored in the first computer system and a fact table of the star schema comprise data stored in the second computer system, and wherein the fact table includes a first column of surrogate values, wherein the first column of the fact table is associated with a first column in a first dimension table, wherein the first column in the first dimension table includes said surrogate values, the first dimension table comprising a second column comprising actual values corresponding to the surrogate values;

wherein the received query is an SQL query specifying at least a first column in a first table stored in the first computer system and at least a second column in a second table stored on the second computer system, wherein accessing the non-sensitive data includes generating a derived SQL query specifying the one or more columns in the second table and one or more third columns in the first table.

10. The computer system of claim 9 wherein the non-sensitive data is accessed by generating a first derived query from the received query and executing the first derived query against database tables stored at the second computer system.

11. The computer system of claim 10 wherein the response is generated by further generating a second derived query from the received query and executing the second derived query against at least some of the non-sensitive data accessed from the second computer system and the sensitive data that is stored locally at the first computer system.

* * * * *